United States Patent [19]

Frechtling et al.

[11] 3,971,753

[45] July 27, 1976

[54] POLYMER COMPOSITES AND PREPARATION THEREOF

[75] Inventors: Arthur C. Frechtling, Watchung; Norman W. Johnston, East Windsor; Richard G. Shaw, Asbury, all of N.J.

[73] Assignee: Union Carbide Corporation, New York, N.Y.

[22] Filed: Dec. 13, 1973

[21] Appl. No.: 424,281

[52] U.S. Cl................. 260/42.14; 260/17.4 R; 260/17.4 GC; 260/17.4 CL; 260/17.5; 260/42.16; 260/42.53; 260/42.56; 260/45.7 R; 260/45.9 R; 260/45.9 NP; 260/857 G; 260/873; 260/878 R; 260/879; 260/881; 260/884; 428/290; 428/404; 428/406; 428/407
[51] Int. Cl.$^2$.................... C08K 9/04; C08K 9/10
[58] Field of Search........... 260/42.14, 42.53, 42.16, 260/17.4 R, 17.4 GC, 17.4 CL, 17.5, 857 G, 873, 878 R, 879, 881, 884

[56] References Cited

UNITED STATES PATENTS

| 2,692,868 | 10/1954 | Berry et al. | 260/42.53 |
| 3,068,185 | 12/1962 | Stamberger | 260/42.53 |
| 3,208,984 | 9/1965 | Dekking | 260/42.53 |
| 3,265,644 | 8/1966 | Herman et al. | 260/42.14 |
| 3,519,593 | 7/1970 | Bolger | 260/42.53 |

*Primary Examiner*—James H. Derrington
*Attorney, Agent, or Firm*—Bernard Francis Crowe

[57] ABSTRACT

Polymer composites having enhanced mechanical or chemical properties have been prepared by first coating the filler component of the composite with a free-radical polymerization initiator which adheres to the surface of the filler and then polymerizing an ethylenically unsaturated monomer onto the filler.

23 Claims, No Drawings

POLYMER COMPOSITES AND PREPARATION THEREOF

BACKGROUND OF THE INVENTION

This invention pertains to polymer composites and more particularly to those containing a filler polymerization initiator complex onto which an ethylenically unsaturated monomer has been polymerized.

Composite material systems consisting of a thermoplastic resin matrix reinforced with a filler have found wide use as structural materials. The effectiveness of the fillers as reinforcing agents is directly related to the adhesion between the filler and the matrix resin. If the adhesion between the matrix resin and the filler is poor as in the case of poor wettability of the filler by the matrix resin, the reinforcing effect of the filler is limited and may actually be deleterious in the extreme case of very poor adhesion.

SUMMARY OF THE INVENTION

A composite having enhanced mechanical and physical properties is provided by:
 a. coating the surface of a filler substrate with a free radical polymerization initiator containing polar functional groups having an affinity for and which adhere to the surface of said substrate;
 b. contacting the initiator-coated substrate with an amount of an ethylenically unsaturated monomer sufficient to at least cover the total surface area of said substrate; and
 c. adjusting the temperature of the initiator coated substrate-vinyl monomer combination to a point where the initiator decomposes to form free radicals until a layer of the ethylenically unsaturated monomer polymerizes on the substrate.

DESCRIPTION OF THE INVENTION

The resins which can be used as the matrix in the composites of this invention are myriad. For example, they can include polyalkyl acrylates, polyalkyl methacrylates, wherein each have 1 to about 18 carbon atoms in the alkyl group, polyacrylonitrile, polystyrene, polyvinyl chloride, vinyl chloridevinyl acetate copolymers, polybutadiene, polyisoprene, polyethylene, polypropylene, acrylonitrile-butadiene-styrene copolymers and like vinyl or addition thermoplastic polymers.

Fillers which can be used as the substrate of this invention are legion and include both organic as well as inorganic materials. Exemplary of the organic materials which can be used are cellulosic products including wood products in form of kraft paper, chips, coarse flour, gram flour, and the like, comminuted cellulose products, including chopped paper, diced resin board, pulp preforms, and the like; fibers including alpha cellulose, cotton flock, jute sisal, rayon and the like; lignin products including ground bark and processed lignin; synthetic fibers including polyamides such as nylon, polyesters, such as polyethylene terephthalate, polyacrylonitrile and the like; carbon in the form of carbon black including either channel black or furnace black, ground petroleum coke, graphite filaments, graphite whiskers, and the like. Among the inorganic fillers which can be used are silica products including minerals such as sand, quartz, tripoli, diatomaceous earth, and the like and synthetic materials including wet process silica, pyrogenic silica, silica aerogel, and the like; silicates including minerals such as asbestos in the form of chrysotile, amosite, anthophyllite, crocidolite, tremolite, or actinolite, kaolinite, mica, nepheline, syenite, talc, or wollastonite as well as synthetic silicates including calcium silicate and aluminum silicate; glass in the form of glass flakes, hollow glass spheres, solid glass spheres, milled fibers, fibrous glass in the form of filament, rovings, woven roving, yarn, mat, or fabric; metals such as steel, tungsten, titanium, beryllium filaments, molybdenum filaments; boron filaments; metallic oxide including zinc oxide, aluminum oxide, magnesium oxide, titanium oxide, thorium oxide, zirconium oxide, and the like; calcium carbonate in the form of chalk, limestone, or precipitated calcium carbonate; polyfluorocarbons and the like.

A further ramification of this invention is its extension to the use of fillers in composites having as its primary purpose one other than solely as a reinforcement for improving mechanical or physical properties of a matrix resin. For example, discrete particles of diammonium phosphate, ammonium sulphamate, hexabromobenzene or other known fire retardants can have polymerized onto them a continuous covering of an organic polymer and then blended in or dispersed through a matrix resin to afford a flame retarded composite. This procedure provides a continuous interfacial boundary around the fire retardant particles and prevents their migration into or out of the resin matrix providing a composite which does not change upon storage or aging. In such a system the flame retardant is suitably dispersed and is available to perform its function, should the need arise, upon exposure to incindiary temperatures. This technique is particularly applicable to water soluble fire retardants which can be leached out of articles in which they have been deposited. Thus, e.g., less than 1% of methyl methacrylate polymerized onto diammonium phosphate previously treated with succinic acid peroxide lowers the solubility considerably. The use of a crosslinking monomer, such as, divinyl benzene lowers the solubility even more.

The instant invention can also be practised in conjunction with conventional polymerization techniques. Thus, for example, polymer coated filler substrate particles can first be prepared and these can then be introduced into a polymerization system where conventional polymerization initiation is used. The polymer formed in the latter step collapses around the polymer coated substrate particles.

The term "composite" as used in this invention is intended to encompass products obtained by combining a resin matrix with a filler in a general sense as well as systems in which the filler functions as a reinforcement for the resin matrix in a synergistic relationship, i.e., the physical and mechanical properties of these products are superior to those of both the resin matrix and the reinforcing filler alone. This concept also includes such terms as laminates and reinforced plastics since there is no rigid definition universally accepted in this art.

The bonding of organic polymer to the surface of the reinforcing filler substrate is effected by coating the surface of the reinforcing filler substrate with a free radical polymerization initiator containing one or more polar functional groups having an affinity for and which adhere to the surface of said substrate followed by contacting the initiator coated substrate with an amount of an ethylenically unsaturated monomer sufficient to at least cover the total surface area of said substrate and then raising the temperature of the initiator coated substrate — ethylenically unsaturated vinyl monomer combination to a point where the initiator decomposes to form free radicals attached to the substrate and maintaining this temperature until a layer of the ethylenically unsaturated monomer polymerizes on the substrate.

The selection of ethylenically unsaturated monomers for the preparation of suitable organic polymers is not narrowly critical but preferred monomers include acrylonitrile, alkyl acrylates or methacrylates having 1 to about 18 carbon atoms in the alkyl group, i.e., methyl through octadecyl acrylates or methacrylates, vinyl chloride, styrene, divinyl benzene, and the like.

The above listed monomers can be used alone or in combination to form homopolymers or copolymers. The monomer feed may also be varied qualitatively to afford graded layers of different polymer species.

It will be understood by those skilled in the art that the composites available may consist simply of filler and a single extensive continuous polymer phase or filler particles or segments may be first coated with a layer of polymer and in a second step the polymer coated filler blended with a quantity of the same polymer or another polymer or combination of polymers. The latter procedure affords a means of improving compatibility between filler and polymer where it is desired to prepare a filler reinforced composite in which the uncoated filler and the continuous polymer phase are not compatible.

If the non-aqueous suspension polymerization technique is to be used, the procedure described in U.S. Pat. No. 3,519,701 for the preparation of polyvinyl esters and derivatives therefrom can be used and this reference is incorporated herein.

The choice of free radical polymerization initiators is not narrowly critical but as will be recognized by those skilled in art it will depend in part upon the ethylenically unsaturated monomer being polymerized. Therefore it is preferred to use an initiator having a half life which provides a reasonable polymerization rate at the optimum polymerization temperature of the particular ethylenically unsaturated monomer used. The other requirement for the choice of polymerization free radical initiator is that its molecule contains the polar group which will anchor or adhere the free radical polymerization initiator to the surface of the filler substrate and which will remain intact after the decomposition of the initiator into free radical form. Preferred polar functional groups are carboxyl groups, carboxamide groups, hydrocarbyl amines, hydrocarbyl hydroxyls, and the like.

A preferred free radical polymerization initiator meeting the above criteria is succinic acid peroxide. Other free radical initiators meeting these criteria include t-butyl peroxy maleic acid, t-butylazoformamide and 4-t-butylazo-4-cyanovaleric acid.

The invention is further described in the Examples which follow. All parts and percentages are by weight unless otherwise specified.

EXAMPLE 1

A four neck, 250 ml. glass resin kettle equipped with a Teflon anchor type stirrer, reflux condenser, thermometer and nitrogen gas inlet tube was charged with 200 grams of glass spheres (size 3000 obtained from Potter Brothers Inc. having an average diameter of 30 microns) which had previously been soaked in a solution of succinic acid peroxide in methanol and then dried to afford a total weight of 1.2 grams of succinic acid peroxide on the 200 grams of glass beads. Then 20 grams of acrylonitrile and 60 grams of normal heptane were added to the kettle. This mixture was heated for two hours at a temperature of about 73° to 75°C. with stirring under an atmosphere of nitrogen. The beads were removed and dried and found to contain a total coating weight of 1.2 to about 1.4 weight per cent of polyacrylonitrile. These coated beads were then extracted for five hours in hot gamma-butyrolactone, removed and dried again. By weighing it was ascertained that about 0.5% by wt. of polyacrylonitrile was retained on the surface of the glass beads. A composite was prepared by blending 30% by wt. of the above treated glass beads into an acrylonitrile-styrene copolymer (having 72% by wt. of styrene copolymerized therein and an inherent viscosity of about 0.8 when measured at a concentration of about 0.2 grams in 100 ml. of methyl ethyl ketone at 30°C.). Various mechanical and physical properties of sheets of the above prepared composite were determined and recorded in Table I. These values were compared with control A, a composite which employed the same acrylonitrile-styrene copolymer with 30% by wt. of untreated glass beads. The data obtained from this composite are also presented for comparison in Table I.

TABLE I

| Mechanical and Physical Properties of Styrene-Acrylonitrile Copolymer/ Glass Bead Composite | Control A (Untreated Glass Beads) | Example 1 (Glass Beads Coated with Polyacrylonitrile) |
| --- | --- | --- |
| Flexural Strength, $10^3$ psi (ASTM D790-59T) | 9.4 | 13.4 |
| Flexural Modulus $10^5$ psi (ASTM D 790-59T) | 5.8 | 8.3 |
| Tensile Strength $10^3$ psi (ASTM D 638-60) | 6.4 | 6.5 |
| Tensile Modulus $10^5$ psi (ASTM D 638-60) | 4.5 | 5.3 |
| Elongation, % (ASTM D 638-60) | 2.5 | 2.2 |

EXAMPLE 2

When Example 1 is repeated with the exception that styrene is substituted for the acrylonitrile, the polystyrene coated glass beads also improve the mechanical properties of composites into which they are blended.

EXAMPLE 3

Using the polymerization procedure described in Example 1, 100 grams of methyl methacrylate were subjected to polymerization with glass beads coated with succinic acid peroxide. The glass beads isolated contained a coating of polymethyl methacrylate. When these are used in composites with a polymethyl methacrylate matrix enhanced mechanical properties are observed.

EXAMPLE 4

Using the polymerization technique described in Example 1 with 100 grams of ethyl acrylate and glass beads coated with succinic acid peroxide the resultant beads were coated with polyethyl acrylate. These coated beads serve to enhance the mechanical properties of polyethyl acrylate matrix resins.

EXAMPLE 5

Using the polymerization procedure described in Example 1 with 100 grams of vinyl chloride as the monomer, glass beads were isolated containing a coating of polyvinyl chloride. These coated beads enhanced the mechanical properties of polyvinyl chloride matrices.

EXAMPLE 6

Using the procedure described in Example 1, 100 grams of dodecyl methacrylate was polymerized with succinic acid peroxide coated glass beads. The glass beads isolated contained a coating of polydodecyl methacrylate. These coated beads enhanced the mechanical properties of polyethylene matrices.

EXAMPLE 7

Using the procedure described in Example 1 with the exception that 100 grams of dodecyl methacrylate was used as the monomer and rayon fibers soaked in succinic acid peroxide were used in place of the glass beads. These were obtained rayon fibers coated with polydodecyl methacrylate. These coated fibers can be used to enhance the mechanical properties of rayon matrices.

EXAMPLE 8

The procedure used in Example 1 was employed with 100 grams of t-butyl peroxy 10-undecenoate and glass beads coated with succinic acid peroxide. The beads which were isolated contained a coating of poly-t-butyl peroxy 10-undecenoate. These coated glass beads can be used to enhance the mechanical properties of polyethylene.

EXAMPLE 9

Using the procedure described in Example 1, 100 grams of butadiene was polymerized onto clay which had been coated with succinic acid peroxide. The clay was isolated with a coating of polybutadiene which when blended into polystyrene acted as an impact modifier and the resultant composite was found to be 30% more improved in impact properties than the same composite made with polybutadiene alone.

EXAMPLE 10

Using the polymerization technique described in Example 1, 100 grams of diammonium phosphate particles having an average particle size of about 5–10 microns was first coated with succinic acid peroxide and then used to polymerize 30 grams of methyl methacrylate onto the surface of these particles. The coated diammonium phosphate particles when blended into a resin matrix of polymethyl methacrylate imparts fire retardant properties to the polymethyl methacrylate matrix.

The time required for 5 g. of uncoated diammonium phosphate particles to dissolve in cold water was 45 seconds. After coating with polymethyl methacrylate as described above 20 to 25% of the particles were still insoluble after twenty washings with water at 80°–90°C. with the duration of each washing being fifteen minutes.

When divinyl benzene was used as the monomer in this experiment in place of the methyl methacrylate, 83% of the coated particles were insoluble after twenty washings.

EXAMPLE 11

Using the procedure delineated in Example 1 methyl methacrylate was polymerized onto glass beads which has been previously soaked in a methanolic solution of t-butyl peroxy maleic acid (TBPMA). The beads were dried, extracted in hot gamma-butyrolactone, and dried again and weighed. The polymer coating was then burnt off and by the difference in weight was found to amount to 0.6% by weight.

In Contrast Control B, which consisted of glass beads which were unreacted with initiator or monomer, taken through the steps of Example 11 showed a weight loss of only 0.1%.

Similarly Control C, which consisted of repeating Example 11 but with the exception that the non-polar initiator t-butyl peroxy privalate was used in place of the TBPMA, showed a weight loss of treated glass beads of only 0.1%.

EXAMPLE 12

Example 11 was repeated substituting t-butyl azoformamide (TBAF) for the TBPMA. The polymethyl methacrylate burnt off the glass beads amounted to 0.3% by weight.

EXAMPLE 13

Example 11 was repeated substituting t-t-butyl peroxy maleic acid for the TBPMA. The polymethyl methacrylate burnt off the glass beads amounted to 0.5% by weight.

Although the invention has been described in its preferred forms with a certain degree of particularity, it is understood that the present disclosure of the preferred forms has been made only by way of Example and that numerous changes may be resorted to without departing from the spirit and scope of the invention.

What is claimed is:

1. A composite comprising a filler substrate, an organic free radical polymerization initiator, which has been decomposed into free radicals, containing carboxyl or carboxamide groups, said initiator bonded through said groups to said substrate and ethylenically unsaturated monomer which has been polymerized to a resin matrix by said initiator free radicals.
2. Composite claimed in claim 1 wherein the resin matrix is polyacrylonitrile.
3. Composite claimed in claim 1 wherein the resin matrix is polystyrene.
4. Composite claimed in claim 1 wherein the resin matrix is polymethyl methacrylate.
5. Composite claimed in claim 1 wherein the resin matrix is polyethyl acrylate.
6. Composite claimed in claim 1 wherein the resin matrix is polyvinyl chloride.
7. Composite claimed in claim 1 wherein the resin matrix is a styrene-acrylonitrile copolymer.
8. Composite claimed in claim 1 wherein the filler substrate is in fiber form.
9. Composite claimed in claim 1 wherein the filler substrate is in sheet form.
10. Composite claimed in claim 1 wherein the filler substrate is in particulate form.
11. Composite claimed in claim 1 wherein the filler substrate is glass.
12. Composite claimed in claim 1 wherein the filler substrate is asbestos.

13. Method of fabricating a composite which comprises the steps of:
 a. coating the surface of a filler substrate with a free radical organic polymerization initiator containing carboxyl or caboxamide groups having an affinity for and which adhere to the surface of said substrate;
 b. contacting the initiator coated substrate with an amount of an ethylenically unsaturated monomer sufficient to at least cover the total surface area of said initiator coated substrate; and
 c. maintaining the temperature of the initiator coated substrate ethylenically unsaturated monomer combination at a point where the initiator decomposes to form free radicals until a layer of the ethylenically unsaturated monomer polymerizes on the substrate.

14. Method claimed in claim 13 wherein the substrate is glass.

15. Method claimed in claim 13 wherein the substrate is asbestos.

16. Method claimed in claim 13 wherein the ethylenically unsaturated monomer polymerized on the substrate at a temperature of about 10° to about 140°C.

17. Method claimed in claim 13 wherein the ethylenically unsaturated monomer is acrylonitrile.

18. Method claimed in claim 13 wherein the ethylenically unsaturated monomer is polymerized in bulk.

19. Method claimed in claim 13 wherein the ethylenically unsaturated monomer is polymerized in a non-aqueous diluent.

20. Method claimed in claim 13 wherein the polymerization initiator is t-butyl peroxy maleic acid.

21. Method claimed in claim 13 wherein the polymerization initiator is t-butyl azoformamide.

22. Method claimed in claim 13 wherein the polymerization initiator is 4-t-butylazo-4-cyanovaleric acid.

23. Method claimed in claim 13 wherein the polymerization initiator is succinic acid peroxide.

* * * * *